US009950664B2

(12) United States Patent
Kwon

(10) Patent No.: US 9,950,664 B2
(45) Date of Patent: Apr. 24, 2018

(54) SOUND GENERATING SYSTEM FOR ENVIRONMENT FRIENDLY VEHICLE AND A METHOD FOR CONTROLLING THE SYSTEM

(71) Applicant: DAESUNG ELECTRIC CO., LTD, Ansan-si, Gyeonggi-do (KR)

(72) Inventor: Dae Woo Kwon, Suwon-si (KR)

(73) Assignee: LS AUTOMOTIVE TECHNOLOGIES CO., LTD., Anyang-si, Gyeonggi-do (KR)

( * ) Notice: Subject to any disclaimer, the term of this patent is extended or adjusted under 35 U.S.C. 154(b) by 0 days.

(21) Appl. No.: 15/196,200

(22) Filed: Jun. 29, 2016

(65) Prior Publication Data

US 2017/0001559 A1    Jan. 5, 2017

(30) Foreign Application Priority Data

Jun. 30, 2015 (KR) .......................... 10-2015-0093097

(51) Int. Cl.
*B60Q 1/22* (2006.01)
*B60Q 5/00* (2006.01)
*G10K 15/02* (2006.01)

(52) U.S. Cl.
CPC ............ *B60Q 5/008* (2013.01); *G10K 15/02* (2013.01)

(58) Field of Classification Search
CPC .............................. B60Q 5/008; G10K 15/02
USPC ........ 340/463, 464, 465, 466, 467, 468, 469
See application file for complete search history.

(56) References Cited

U.S. PATENT DOCUMENTS

| 2011/0032122 A1* | 2/2011 | Hayashi | ................... G08G 1/04 340/943 |
| 2012/0166042 A1* | 6/2012 | Kokido | ................. B60Q 5/008 701/36 |
| 2012/0299718 A1* | 11/2012 | Yoshino | ................... B60Q 1/22 340/466 |

(Continued)

FOREIGN PATENT DOCUMENTS

| JP | 2008-120283 A | 5/2008 |
| JP | 2012-162227 A | 8/2012 |
| JP | 2013-052806 A | 3/2013 |

(Continued)

OTHER PUBLICATIONS

European Search Report dated Jan. 4, 2017.

*Primary Examiner* — Steven Lim
*Assistant Examiner* — Mancil Littlejohn, Jr.
(74) *Attorney, Agent, or Firm* — Rabin & Berdo, P.C.

(57) ABSTRACT

An environmentally-friendly vehicle sound generator apparatus. The apparatus includes a vehicle state sensing unit, a sound source storage unit, a sound source playback unit, a sound source amplification unit, a sound output unit, and a control unit. The control unit receives a sensing signal from the vehicle state sensing unit and controlling the operation of the sound source playback unit so as to play back the operating sound in different playback methods to control and change the operating sound according to the received sensing signal. The vehicle state sensing unit senses a vehicle speed, and if it is determined according to a vehicle speed signal that the vehicle speed reaches a preset speed range, the control unit fades out the output of the sound output unit at a preset ratio of the vehicle speed to a time elapsed after the vehicle speed reaches the preset speed range.

5 Claims, 10 Drawing Sheets

(56) References Cited

U.S. PATENT DOCUMENTS

2013/0009769 A1* 1/2013 Saito .................. B60Q 1/22
340/466
2013/0214920 A1* 8/2013 Konet ................. B60Q 5/008
340/466

FOREIGN PATENT DOCUMENTS

| JP | 2014-104953 A | | 6/2014 |
| JP | 2014104953 A | * | 6/2014 |
| KR | 10-985767 B1 | | 10/2010 |
| WO | WO-2011/098883 A1 | | 8/2011 |

* cited by examiner

SOUND GENERATING SYSTEM FOR ENVIRONMENT FRIENDLY VEHICLE AND A METHOD FOR CONTROLLING THE SYSTEM

CROSS-REFERENCE TO RELATED APPLICATIONS

This application claims the benefit of Korean Patent Application No. 10-2015-0093097, filed on Jun. 30, 2015 in the Korean Intellectual Property Office, which is incorporated herein by reference in its entirety.

BACKGROUND OF THE INVENTION

1. Field of the Invention

The present invention relates to an environmentally-friendly vehicle sound generator apparatus and a control method thereof. More specifically, the present invention relates to an environmentally-friendly vehicle sound generator apparatus and a control method thereof, which senses various operation states of a vehicle and plays back various kinds of operating sounds according to the sensed vehicle operation states or in different playback methods so that a virtual sound, i.e., an operating sound, which is close to a real engine sound according to the vehicle operation states, can be generated and output to be delivered to a driver or a pedestrian, thereby further securing safety of the pedestrian, and inducing a safe drive of the driver.

2. Description of Related Art

In recent years, due to depletion of energy, the development of an environmentally-friendly vehicle as an alternative transportation means is in increasingly active progress. Examples of representative environmentally-friendly vehicles include hybrid vehicles, electric vehicles, hydrogen fuel cell electric vehicles and the like. Since such an environmentally-friendly vehicle does not adopt a method of operating an engine, it does not generate an engine noise or the like while driving unlike an existing internal combustion engine vehicle. Accordingly, the establishment of regulations on the environmentally-friendly vehicles is being prepared to protect pedestrians around a vehicle, and the research and development of a virtually operating sound generation system of an environmentally-friendly vehicle are required in relation to the establishment of regulations.

That is, an environmentally-friendly vehicle such as a hybrid vehicle, an electric vehicle, a hydrogen fuel cell electric vehicle or the like does not generate an engine's unique sound generated from a gasoline vehicle or a diesel vehicle. For this reason, there occur problems in that an accident may occur since a pedestrian does not recognize a vehicle approaching the pedestrian or a vehicle at a place such as an alley or an indoor parking lot, and in that it is also difficult for a driver to recognize the startup state or the current state of a vehicle since a vehicle noise is not generated.

Furthermore, a vehicle including a recharge energy system, such as an electric vehicle, a hydrogen fuel cell electric vehicle or the like, entails problems in that it is difficult to know whether the recharge is started or finished, and in that it is very inconvenient to use the vehicle due to extreme insufficiency of vehicle information that can be recognized by a driver in relation to a risk caused by discharge of a battery or deficiency of fuel.

In an attempt to solve such problems, apparatuses for generating a virtual engine sound for environmentally-friendly vehicles are recently developed. However, virtual engine sound generation apparatuses that are being currently developed simply generate a sound similar to an engine sound associated with the driving of a vehicle and cannot provide various functions to a pedestrian or a driver, and its technical level is still insignificant since information on the current state of the vehicle is provided insufficiently.

In Particular, a conventional apparatus for outputting a sound similar to an engine sound performs a fade-out function of decreasing an output sound when the vehicle travels at a predetermined speed or higher. The fade-out function employs a method of unconditionally blocking the output of the sound simply in proportion to the speed of the vehicle or when a predetermined time period is elapsed after the vehicle speed exceeds the predetermined speed (see FIG. 1). In addition, such a method involves a problem in that since a virtual warning sound is frequently turned on and off in a traffic jam state in which traveling and stopping of the vehicle is repeated due to a frequent change in speed, i.e., a road traffic congestion, around the speed range of the fade-out function, a pedestrian, a driver or a passenger may suffer from a feeling of displeasure or uneasiness in the traffic jam state.

As an example of the prior art, there has been disclosed Korean Patent Registration No. 10-985767.

SUMMARY OF THE INVENTION

The present invention has been made to solve the above-mentioned problems associated with the prior art, and it is an object of the present invention to provide an environmentally-friendly vehicle sound generator apparatus and a control method thereof, which is provided with a fade-out function performed in consideration of both time and vehicle speed to prevent generation of an unpleasant feeling caused by the fade-out function due to frequent acceleration and deceleration around a predetermined speed range of the vehicle.

To achieve the above object, in one aspect, the present invention provides an environmentally-friendly vehicle sound generator apparatus including: a vehicle state sensing unit for sensing an operation state of a vehicle; a sound source storage unit for storing a plurality of operating sounds that can be output according to the operation state of the vehicle in the form of a sound source data; a sound source playback unit for selecting at least one of the operating sounds stored in the sound source storage unit, and playing back the selected sound source output from the sound source storage unit; a sound source amplification unit for amplifying the operating sound played back by the sound source playback unit; a sound output unit for outputting the operating sound amplified by the sound source amplification unit; and a control unit for receiving a sensing signal from the vehicle state sensing unit and controlling the operation of the sound source playback unit so as to play back the operating sound in different playback methods in such a manner as to control and change the operating sound according to the received sensing signal, wherein the vehicle state sensing unit senses a vehicle speed, and wherein if it is determined according to a vehicle speed signal of the vehicle state sensing unit that the vehicle speed reaches a preset speed range, the control unit fades out the output of the sound output unit at a preset ratio of the vehicle speed to a time elapsed after the vehicle speed reaches the preset speed range.

In another aspect, the present invention provides a control method of an environmentally-friendly vehicle sound generator apparatus, the method including:

a providing step of providing an environmentally-friendly vehicle sound generator apparatus including: a vehicle state sensing unit for sensing an operation state of a vehicle; a sound source storage unit for storing a plurality of operating sounds that can be output according to the operation state of the vehicle in the form of a sound source data; a sound source playback unit for selecting one or more of the operating sounds stored in the sound source storage unit, and playing back the selected sound sources output from the sound source storage unit; a sound source amplification unit for amplifying the operating sounds played back by the sound source playback unit; a sound output unit for outputting the operating sounds amplified by the sound source amplification unit; and a control unit for receiving a sensing signal from the vehicle state sensing unit and controlling the operation of the sound source playback unit so as to play back the operating sounds in different playback methods in such a manner as to control and change the operating sounds according to the received sensing signal, wherein the vehicle state sensing unit senses a vehicle speed, and wherein if it is determined according to a vehicle speed signal of the vehicle state sensing unit that the vehicle speed reaches a preset speed range, the control unit fades out the output of the sound output unit at a preset ratio of the vehicle speed to a time elapsed after the vehicle speed reaches the preset speed range; and an operating sound execution step of allowing the control unit to determine whether or not to generate an operating sound of the environmentally-friendly vehicle according to the vehicle operation state sensed by the vehicle state sensing unit, and outputting one or more sound sources, selected among the sound sources stored in the sound source storage unit, as the operating sounds through the sound output unit, wherein the operating sound execution step includes a fade-out step of fading out, if it is determined according to the vehicle speed signal of the vehicle state sensing unit that the vehicle speed reaches a preset speed range, the output of the sound output unit at a preset ratio of the vehicle speed to a time elapsed after the vehicle speed reaches the preset speed range.

In the control method of the environmentally-friendly vehicle sound generator apparatus, the fade-out step (S60) may include a fade-out mode determination step (S61) of comparing the vehicle speed with a preset fade-out mode determination speed, and a fade-out mode execution step (S63) of executing the fade-out mode determined at the fade-out mode determination step (S61).

In the control method of the environmentally-friendly vehicle sound generator apparatus, the fade-out mode execution step (S63) may include a fade-out speed mode of reducing, if the vehicle speed is lower than the preset fade-out mode determination speed, the output of the sound output unit at a preset fade-out speed ratio according to the vehicle speed.

In the control method of the environmentally-friendly vehicle sound generator apparatus, the fade-out speed mode (S65) may include a fade-out vehicle speed calculation step (S651) of updating and calculating a fade-out vehicle speed by averaging the vehicle speed input during a preset holding time, and a fade-out speed output control step (S653) of reducing the output of the sound output unit at a preset fade-out speed ratio according to the fade-out vehicle speed.

In the control method of the environmentally-friendly vehicle sound generator apparatus, the fade-out mode execution step (S63) may include a fade-out time mode (S67) of reducing, if the vehicle speed is higher than the preset fade-out mode determination speed, the output of the sound output unit at a preset fade-out time ratio according to a time elapsed after the vehicle speed enters a range higher than a preset speed.

In the control method of the environmentally-friendly vehicle sound generator apparatus, the fade-out time mode (S67) may include a time counting step (S671) of confirming a time elapsed after the vehicle speed enters a range higher than the preset speed, and a fade-out time output control step (S673) of reducing the output of the sound output unit at the preset fade-out time ratio according to the elapsed time.

The present invention has an advantageous effect in that various operation states of a vehicle are sensed and various kinds of operating sounds are played back according to the sensed vehicle operation states or through variable pitch or mixing in different playback methods so that a further realistic operating sound can be delivered to a driver or a pedestrian according to a vehicle operation state, thereby further securing safety of the pedestrian, and inducing a safe drive of the driver.

In addition, the fade-out function is executed in consideration of a vehicle speed and a time elapsed after the vehicle speed enters a speed over a predetermined speed range so that a feeling of displeasure or uneasiness caused by a frequent change in speed at the time of implementation of the fade-out function can be prevented.

BRIEF DESCRIPTION OF THE DRAWINGS

The above and other objects, features and advantages of the present invention will be apparent from the following detailed description of the preferred embodiments of the invention in conjunction with the accompanying drawings, in which.

EXPLANATION ON SYMBOLS

Figure 1:
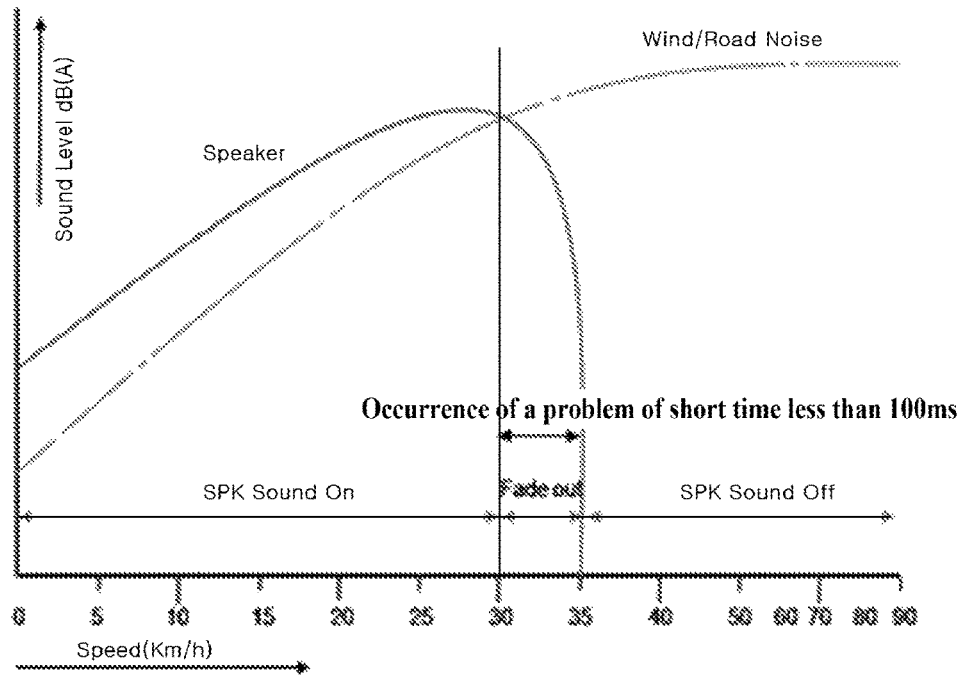
FIGS. 1 and 2 are diagrams showing the problems occurring when a fade-out function of a conventional warning sound apparatus is performed.
Figure 2:
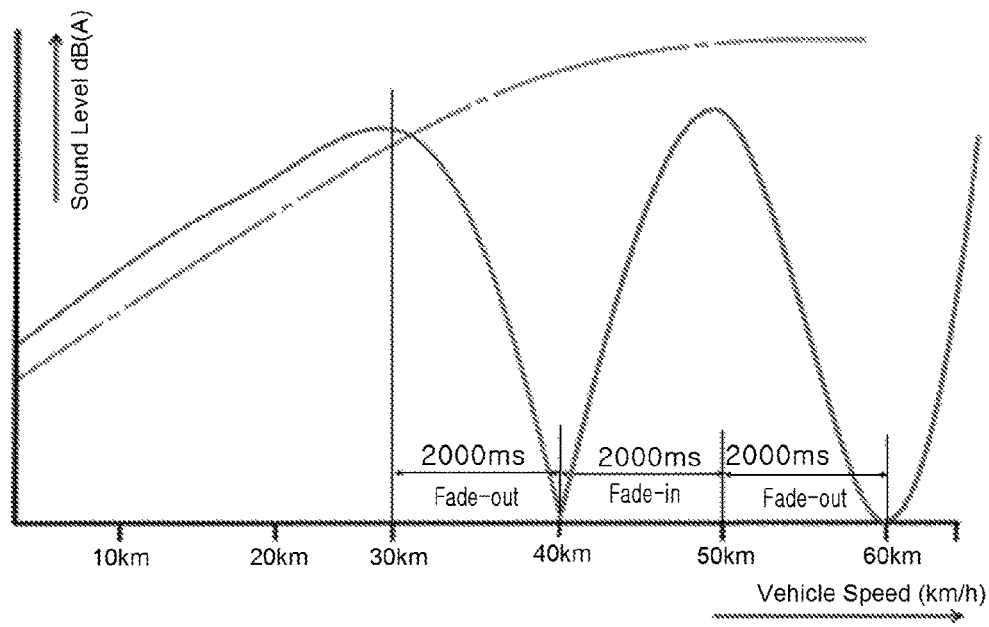

100: Vehicle state sensing unit
200: Operation switch
300: CAN communication unit
400: Control unit
500: Sound source storage unit
510: Data switch unit
600: Sound source playback unit
700: Sound source amplification unit
800: Sound output unit
810: External output unit
820: Internal output unit

DESCRIPTION OF THE PREFERRED EMBODIMENTS

Now, preferred embodiments of the present invention will be described hereinafter in detail with reference to the accompanying drawings. It should be noted that the same elements in the drawings are denoted by the same reference numerals although shown in different figures. In the following description, the detailed description on known function and constructions unnecessarily obscuring the subject matter of the present invention will be avoided hereinafter.

An environmentally-friendly vehicle sound generator apparatus according to this embodiment is an apparatus for generating and providing a further realistic and safe virtual operating sound to a driver or a pedestrian by applying various operating sounds or playback methods according to an operation state of a vehicle. The environmentally-friendly vehicle sound generator apparatus includes a vehicle state sensing unit 100, a sound source storage unit 500, a sound source playback unit 600, a sound output unit 800 and a control unit 400.

The vehicle state sensing unit 100 is configured to sense an operation state of a vehicle. Since various operating sounds can be generated according to the operation state of a vehicle sensed through the vehicle state sensing unit, the vehicle state sensing unit is preferably configured to sense various operation states of the vehicle. For example, the vehicle state sensing unit 100 may include a start button 110 of the vehicle, a torque sensor 120 for sensing an output torque of an electric motor which is a power generation means of the vehicle, an inhibitor switch 130 for sensing and outputting a gear shift range of a vehicle transmission when the vehicle transmission is provided, an acceleration pedal position sensor 140 for sensing and outputting a position of the acceleration pedal to confirm whether or not the driver accelerates the vehicle, a brake pedal position sensor 150 for sensing and outputting a position of the brake pedal to confirm the position of the brake pedal of the driver, a battery sensor 160 for sensing a charged state of power energy of the vehicle, and a charging cable 170 for confirming connection to a charging connector when the charging connector (not shown) is separately provided in the vehicle. In some cases, if the vehicle is a hybrid vehicle, i.e., the vehicle includes a vehicle engine as an internal combustion engine, a crank position sensor (CPS) for sensing an operation state of the engine, i.e., whether or not the engine is started, and sensing an engine rotation speed of the engine may be further provided. In addition, although it is not shown in the figure, a separate vehicle speed sensor for sensing a vehicle speed by sensing the rotation speed of the wheel itself can be further provided. Other than these, the vehicle state sensing unit 100 may be configured to sense various kinds of vehicle operation states, such as an operation ready state of the vehicle, an operation speed of an electric motor, a driving speed of the vehicle and the like. It may be configured to sense each of the operation states through a separate sensor or the like, and the speed, acceleration and the like of the vehicle can be determined through the operation states sensed here, and an operating sound of a form further appropriate to the current operation state can be generated using the sensed operation states.

The sound source storage unit 500 is configured to store various kinds of operating sounds, which can be output according to an operation state of the vehicle, in the form of a sound source data. For example, an engine start sound of a vehicle, i.e., the engine start sound generated when an engine starts, a driving sound generated when the vehicle drives, particularly, an operating sound such as a light acceleration driving sound of an engine generated when the vehicle drives at a low speed of 20 to 30 km/h, a rapid acceleration driving sound generated when the engine abruptly accelerates, and a sudden brake driving sound generated when the vehicle abruptly stops by abrupt operation of the brake, an acoustic sound such as a separate warning sound including a recharge start sound expressing a state of starting recharge of the vehicle, a recharge end sound expressing a state of ending the recharge and a recharge warning sound expressing a request of charging cable connection caused by disconnection of the charging cable when recharge is needed, a voice sound formed in a voice guidance message and the like can be stored in the form of a sound source data.

The sound source playback unit 600 is controlled in operation by the control unit 400, and is configured to select any one of the operating sounds stored in the sound source storage unit 500 and play back the selected operating sound in various playback methods. For example, a sound source can be played back in a method of increasing or decreasing volume of an operating sound, or the sound source can be played back in a fade-in method of gradually increasing the volume or a fade-out method of gradually decreasing the volume to naturally express a sound source.

In addition, the sound source may be played back by adjusting the frequency of an output sound source according to the position of the acceleration pedal, operation speed of the electric motor, operation torque of the electric motor or the like sensed by the vehicle state sensing unit 100.

In this embodiment, the sound source playback unit 600 is provided with a sound source mixing unit 610 and a pitch variation unit 620, and the sound source mixing unit 610 of the sound source playback unit may output an operating sound by mixing a plurality of sound source data, and the pitch variation unit 620 may make it possible to recognize change of sound through change of pitch of one octave or more in the audio frequency domain by varying the pitch of a corresponding operating sound. In this embodiment, the sound source playback unit 600 outputs an operating sound by simply changing the volume, or outputs an operating sound improving recognizability through change of frequency of one octave or more by simultaneously changing the pitch and the volume, or the sound source playback unit 600 forms a basic low frequency sound source of a 100 Hz to 300 Hz range, which does not have change of pitch and volume, as a basic operating sound using the sound source mixing unit 610, selects a sound source increasing the volume as an additional operating sound, in addition to a sound source having a frequency component larger than the frequency domain initially generated by the change of frequency according to the vehicle speed, and mixes and outputs the sound sources, or the sound source playback unit 600 divides the frequency domain based on a predetermined vehicle speed and selects a sound source having a range of frequency change different from that of the pitch and the volume as an operating sound according to the vehicle speed and naturally connects two overlapped sound sources in a method of fading in and fading out a sound source in a section overlapping a plurality of sound sources. In addition, a basic low frequency sound source is formed as a basic operating sound in a method of outputting a sound source of rapid acceleration or sudden braking, and in the case of a rapid acceleration driving sound, a sound source expressing a strongly accelerating state is mixed by extending the range of frequency change, and in the case of a sudden brake driving sound, a decelerating state of the vehicle can be expressed by using a sound source which also decreases the volume while moving from a high frequency domain to a low frequency domain as the vehicle speed decreases. In addition, in the case of a rapid acceleration in which the vehicle speed exceeds a predetermined level, a basic low frequency sound source is formed as a basic operating sound, and a sound source increasing the volume while moving from a low frequency domain to a high frequency domain in a wide range of frequency change is used as a rapid acceleration driving sound, so that a pedestrian or a driver may recognize the rapid acceleration state at a predetermined speed or higher by increasing the pitch and the volume of the operating sound.

The sound output unit 800 is a device for outputting an operating sound played back by the sound source playback unit 600, and as shown in FIG. 1, it may be configured of an external output unit 810 for outputting an operating sound outside the vehicle to be delivered to a pedestrian and an internal output unit 820 for outputting an operating sound inside the vehicle to be delivered to the driver. Any one or both of the external output unit 810 and the internal output unit 820 can be selected according to a played back operating sound and controlled by the control unit 400 to output the operating sound. The external output unit 810 may be mounted to be arranged inside the bonnet of the vehicle to deliver an operating sound related to the current vehicle operation state to a pedestrian positioned in front of or beside the vehicle or the driver, and the internal output unit 820 may be separately mounted inside the vehicle to deliver an operating sound into the interior space of the vehicle to deliver an operating sound related to the current vehicle operation state to the driver.

The control unit 400 receives various sensing signals sensed by the vehicle state sensing unit 100, controls the operation of the sound source playback unit 600 to play back different kinds of operating sounds in different playback methods according to the received sensing signal, and generally controls the operation state of the entire system. At this point, the control unit 400 is configured to receive the sensing signal from the vehicle state sensing unit 100 through a CAN communication unit 300.

The data switch unit 510 shown in FIG. 1 performs an intermediate switch function to prevent data collision in the process of writing, reading or deleting a sound source data from the sound source storage unit 500 by the control unit 400 and the sound source playback unit 600. The sound source amplification unit 700 is configured to receive a sound source output from the sound source playback unit 600, generate an energy component larger than the energy component of the sound source output from the sound source playback unit 600 to deliver the sound source to the driver or a pedestrian through the sound output unit 800, and output the sound of a large energy component to the outside.

According to such a configuration, since the environmentally-friendly vehicle sound generator apparatus according to an embodiment of the present invention senses various operation states of a vehicle and outputs an operating sound of a form appropriate to a corresponding operation state according thereto, safety of a pedestrian can be secured as the pedestrian recognizes a vehicle state, and, in addition, since a driver may further correctly recognize the current operation state of the vehicle, a driving condition of the driver can be maintained further conveniently and safely.

Figure 3:
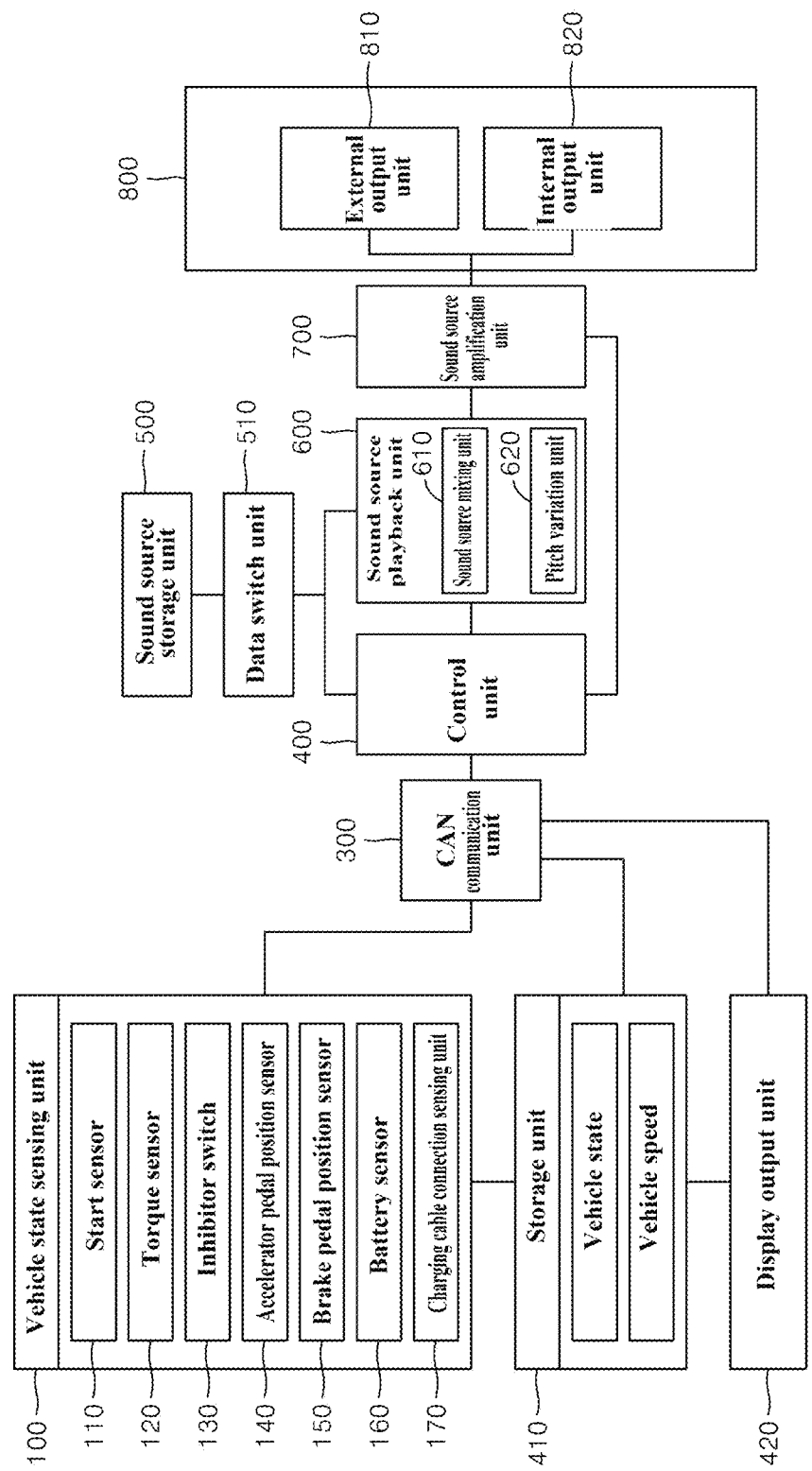
FIG. 3 is a schematic block diagram the configuration of an environmentally-friendly vehicle sound generator apparatus according to an embodiment of the present invention.
Figure 4:
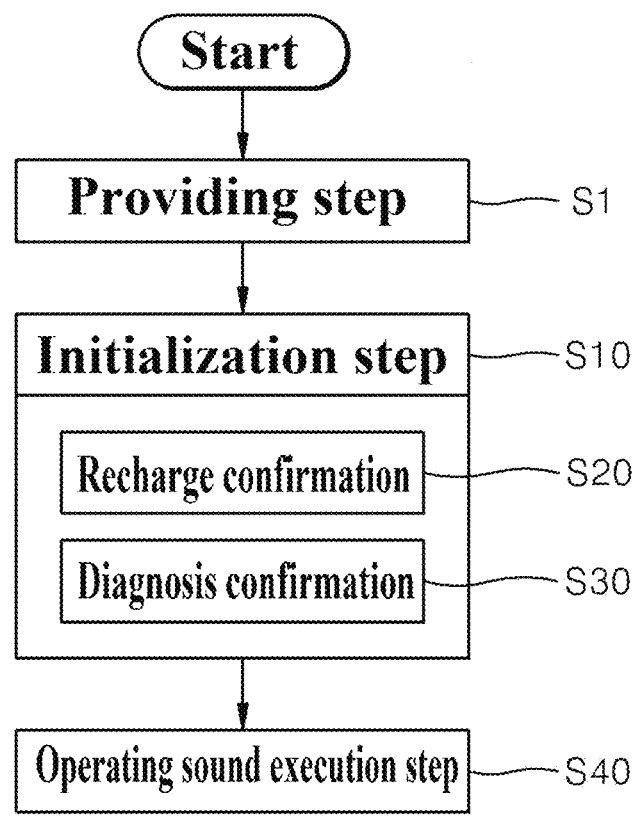
FIGS. 4 to 9 are flowcharts illustrating the control method of an environmentally-friendly vehicle sound generator apparatus according to an embodiment of the present invention.
Figure 5:
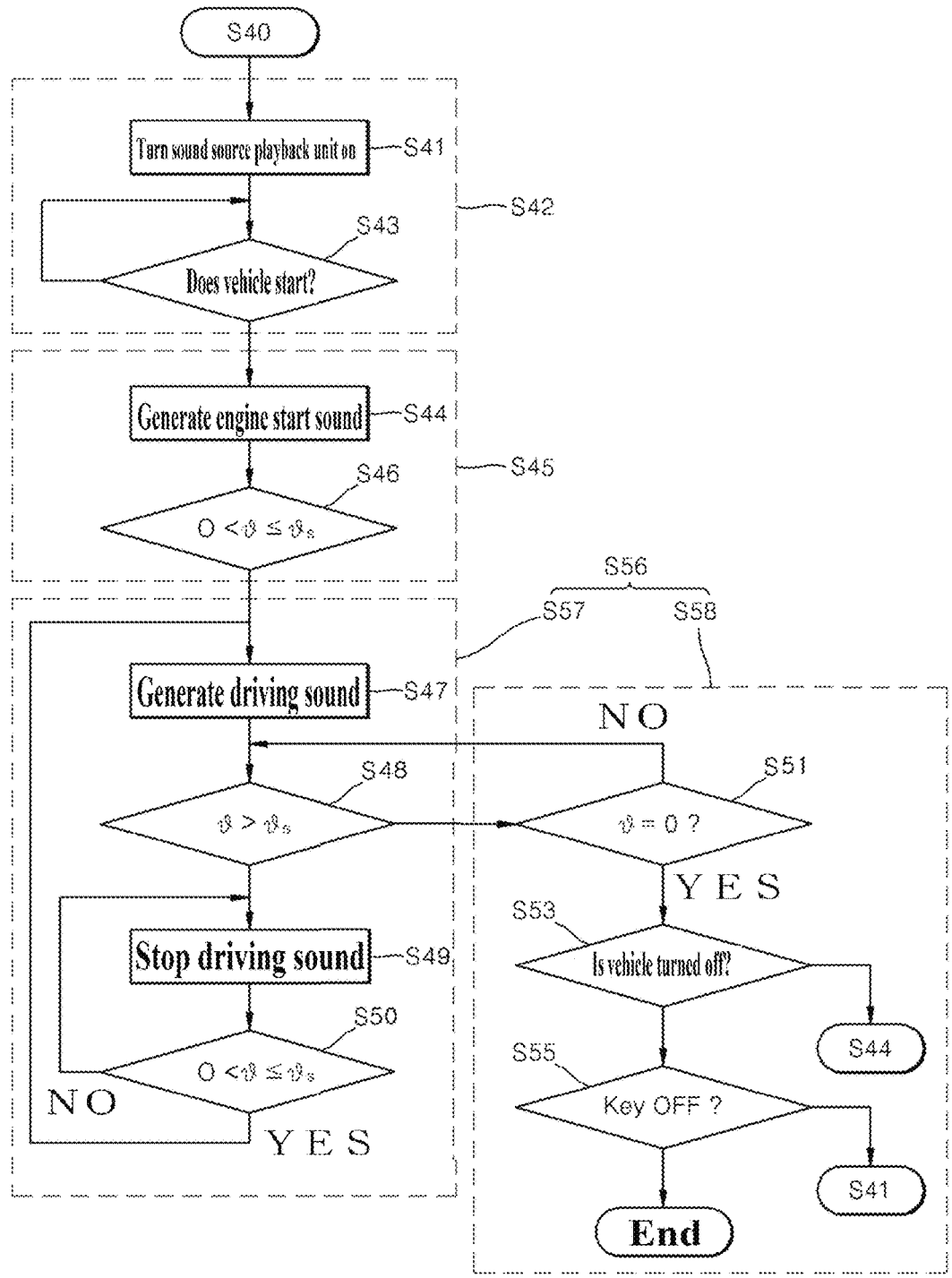
Figure 6:
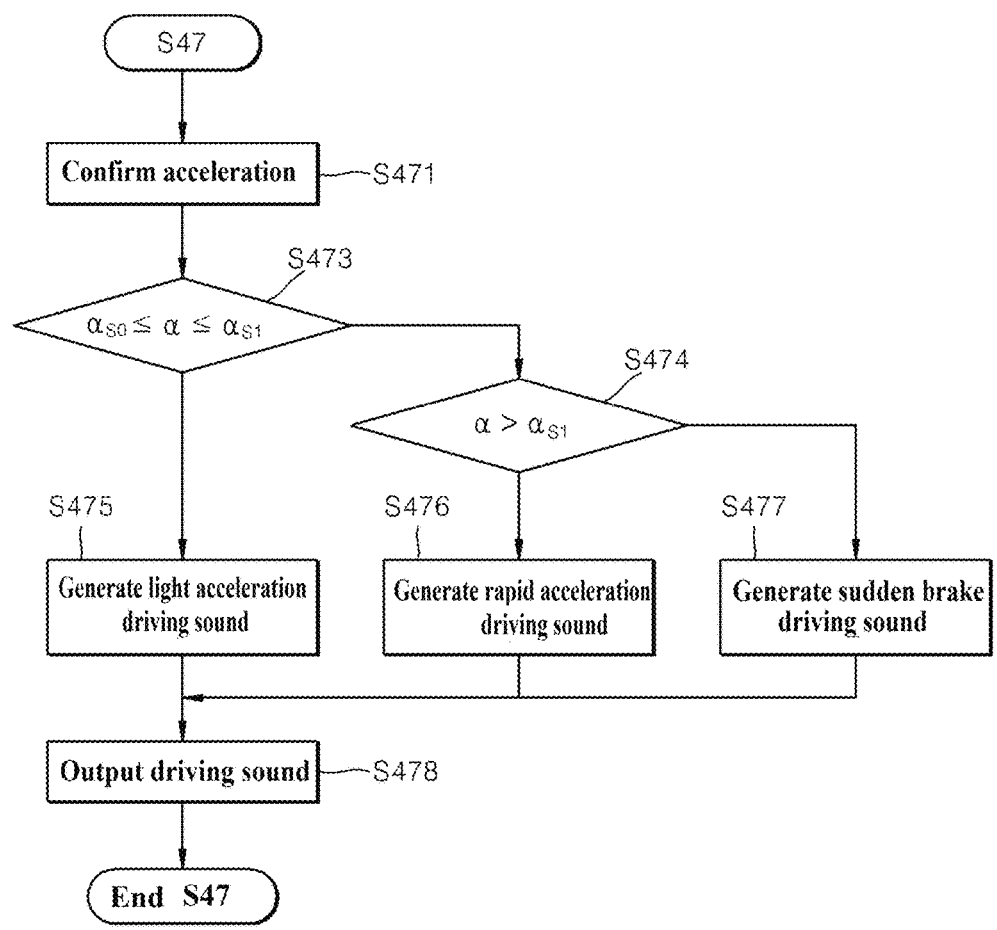

On the other hand, the environmentally-friendly vehicle sound generator apparatus according to an embodiment of the present invention may be further provided with a separate operation switch (not shown) as shown in FIG. 3, and the operation switch (not shown) may be configured to be handled by a user to perform an on/off operation. According to an on/off signal of the operation switch, the control unit 400 may control the operation to turn on or turn off the operation state of the sound source playback unit 600.

That is, a user may turn on or turn off the operation of the sound source playback unit 600 by configuring the apparatus to turn on or turn off the operation by mounting the operation switch inside the vehicle. For example, if a user desires to enjoy driving in a very calm state, the user may handle the operation switch to a turned off state not to play back and output an operating sound generated according to a vehicle operation state.

Hereinafter, a control process, i.e., an operation process, of an operating sound generation apparatus according to an embodiment of the present invention will be described with reference to the drawings. First, a providing step (S1) of providing an environmentally-friendly vehicle sound generator apparatus according to an embodiment of the present invention is executed, and description of the environmentally-friendly vehicle sound generator apparatus is substituted by the above descriptions to avoid duplicated descriptions.

Then, the control unit applies a control signal for executing an initialization step, and the initialization step (S10) includes a diagnosis confirmation step (S30) of confirming, by the control unit 400, a connection state of the sound output unit 800 and an operation state of the sound source playback unit 600 and diagnosing existence of distortion by comparing output of the sound source amplification unit 700 with a preset reference value. That is, the diagnosis confirmation step (S30) confirms and diagnoses a normal operation state of the sound source playback unit, the sound source output unit or the like in the initialization step to prevent possibility of safety accident, which may occur if a predetermined sound preset according to a driving state or the like of the vehicle is not output, by confirming generation of an error in the process of storing a sound source in the sound source storage unit and finally playing back and outputting the sound source by the sound output unit through the sound source playback unit. In this embodiment, although the diagnosis confirmation step (S30) is described as an additional step executed in the initialization step of the vehicle, in some cases, it can be diversely modified to execute a process of determining whether or not a vehicle diagnosis device (not shown) is connected to an On Board Diagnostic (OBD) terminal of the vehicle and diagnosing whether or not playback, amplification and output of the sound source are in a normal state through the vehicle diagnosis device, and in some cases, various modifications such as a configuration excluding the initialization step can be made.

Meanwhile, after the completion of the initialization step (S10) of the present invention, the control unit 400 executes an operating sound execution step (S40) of determining whether or not an operating sound of the environmentally-friendly vehicle, i.e., generation of the operating sound, is needed according to the vehicle operation state sensed by the vehicle state sensing unit, amplifying one or more sound sources selected among the sound sources stored in the sound source storage unit 500, and outputting the amplified sound as an operating sound through the sound output unit.

The operating sound execution step (S40) includes an operating sound source playback unit operating step (S41), an engine start sound operating step (S42), a driving sound operating step (S45) and a continuation confirmation step (S56).

First, at the operating sound source playback unit operating step (S41), the control unit 400 switches the sound source playback unit 600 to the turned-on state, and switching to the turned-on state refers to receiving a sound source, such as an engine start sound, various driving sounds or the like stored in the sound source storage unit 500, from the sound source storage unit 500 through the data switch unit 510 according to a predetermined control signal and forming an execution preparation ready state, by the sound source playback unit 600, in order to output an operating sound.

Then, the control unit 400 executes the engine start sound operating step (S42), at the engine start sound operating step (S42), whether or not the vehicle engine starts is determined from an engine state sensing signal of the vehicle state sensing unit 100, and the engine start sound among the sound sources of an operating sound for informing an operation state of the environmentally-friendly vehicle is output through the sound output unit. More specifically, the engine start sound operating step (S42) includes an engine start determination step (S43) and an engine start sound output step (S44). At the engine start determination step (S43), the control unit 400 determines whether or not the vehicle engine starts from the engine state sensing signal, and a start signal from the start button 110 can be used as the engine state sensing signal, or a crank position sensor of the vehicle state sensing unit 100 can be used in some cases.

If it is determined at the step S43 that the vehicle is not in an engine start state, the control unit 400 executes the step S43 to repeatedly sense and determine whether or not the vehicle engine starts by repeatedly updating the engine state sensing signal at predetermined waiting time intervals. Contrarily, if it is determined at the step S43 that the vehicle is in an engine start state, the control unit 400 outputs an engine start sound by executing the step S44. That is, the control unit 400 controls the sound source playback unit 600 to play back a sound source corresponding to the engine start sound among the sound sources stored in the sound source storage unit 500, and the played back sound source is output by way of the sound source amplification unit 700 and the sound output unit 800. At this point, output of the engine start sound is accomplished by the external output unit 810, and in some cases, the engine start sound may output from the internal output unit 820, and the output sound pressure may be formed to be different in the external output unit and the internal output unit.

Then, if the engine start state is formed by outputting the engine start sound, the control unit 400 executes the driving sound operating step (S45). At the driving sound operating step (S45), the control unit 400 determines whether or not the vehicle is driving from a vehicle driving speed signal of the vehicle state sensing unit 100, plays back a sound source corresponding to a driving sound among the sound sources of the operating sound stored in the sound source storage unit 500 through the sound source playback unit 600. The sound source is amplified by the sound source amplification unit 700, and the driving sound is output through the sound output unit 800. The driving sound operating step (S45) includes a driving state determination step (S46) and a driving sound output step (S47), and the driving state determination step (S46) may sense a vehicle speed through at least any one of an operation speed of the electric motor, an operation torque of the electric motor and a position of the acceleration pedal, and the control unit 400 compares the sensed vehicle speed with a preset speed for determining whether or not the vehicle is driving, which is one of preset data stored in the storage unit 410.

The present invention may be diversely modified, such as taking a configuration in which if it is determined at the step S46 that the vehicle speed V is not within the range of the preset speed, i.e., not in a range higher than zero and lower than the preset speed Vs, in other words, if it is determined that the vehicle is in a stopped state, there is further provided a step of determining again, by the control unit 400, whether or not the vehicle speed is in a stopped state by updating information on the vehicle speed after a predetermined time delay as shown in this embodiment or separately confirming whether or not the engine stops by sensing whether or not the vehicle engine is turned off, and then whether or not the vehicle speed is in a stopped state is determined again by updating information on the vehicle speed.

If the vehicle speed V is within the range of the preset speed, i.e., in a range higher than zero and lower than the preset speed Vs, the control unit 400 determines that the vehicle is currently in a driving state for outputting a driving sound and executes the driving sound output step (S47) of generating a driving sound from a sound source stored in the sound source storage unit 500 by the sound source playback unit 600 and outputting the driving sound through the sound source amplification unit 700 and the sound output unit 800. Since the driving sound output step (S47) outputs the driving sound using a sound source of a driving sound corresponding to a predetermined operating sound according to the current driving state of the vehicle, a pedestrian or a driver may intuitively recognize a driving state through change of the driving sound with respect to various driving environments.

That is, the driving sound output step (S47) includes a vehicle's driving acceleration confirmation step (S471), an acceleration driving state determination step (steps S473 and S474) and a driving sound output execution step (steps S475, S476, S477 and S478), and at the driving acceleration confirmation step (S471), the control unit 400 confirms the current driving acceleration state of the vehicle using the vehicle state information of the vehicle state sensing unit 100. Various configurations can be made within a range capable of confirming the driving acceleration of the vehicle, such as when the vehicle state sensing unit is separately provided with a vehicle acceleration sensor, driving acceleration of the vehicle can be confirmed from the vehicle acceleration sensor, or a method of deriving acceleration of the vehicle using the driving speed of the vehicle can be used.

The acceleration driving state determination step (steps S473 and S474) determines whether or not the vehicle is in an acceleration driving state by comparing a vehicle driving acceleration signal of the vehicle state sensing unit 100 with a preset acceleration reference value, and the driving sound output execution step (steps S475, S476, S477 and S478) sets one of a light acceleration driving sound, a rapid acceleration driving sound and a sudden brake driving sound among the operating sounds as a corresponding driving sound according to a result of the determination made at the acceleration driving state determination step and generates and outputs the corresponding driving sound.

The acceleration driving state determination step (steps S473 and S474) includes a light acceleration driving determination step (S473) and a rapid acceleration driving determination step (S474).

First, the light acceleration driving determination step (S473) of determining whether or not the current driving state of the vehicle is within a light acceleration driving range is executed using the acceleration information of the vehicle confirmed at the driving acceleration confirmation step (S471). At the light acceleration driving determination step (S473), the control unit 400 determines whether or not the vehicle driving acceleration signal is within the range of the preset reference value, and if the vehicle driving acceleration signal is within the range of the preset reference value, the current driving state of the vehicle is determined as a light acceleration state including a constant driving state. At this point, the preset reference value is a preset value stored in the storage unit 410, and in this embodiment, it includes a first preset acceleration reference value as0 and a second preset acceleration reference value as1. Here, the first preset acceleration reference value as0 may have a value of zero or a value smaller than zero according to a design specification, and here, if the first preset acceleration reference value as0 has a value smaller than zero, it is referred to as a light acceleration driving determination step in this embodiment, however, it can be understood to include determination of a light deceleration driving, other than the light acceleration.

The acceleration driving state determination step (steps S473 and S474) includes the rapid acceleration driving determination step (S474), and the rapid acceleration driving determination step (S474) is executed when the control unit 400 determines at the light acceleration driving determination step (S473) that the vehicle driving acceleration signal does not exist within the range of a preset reference value, and it is determined whether or not the vehicle driving acceleration signal exceeds the range of the preset acceleration reference value, more specifically, exceeds the second preset acceleration reference value as1. If the control unit 400 determines at this step that the current acceleration of the vehicle exceeds the second preset acceleration reference value as1, the control unit 400 determines the current driving state of the vehicle as a rapid acceleration state, and, contrarily, if the control unit 400 determines that the current acceleration of the vehicle does not exceed the second preset acceleration reference value as1, the control unit 400 determines the current driving state of the vehicle as a rapid deceleration state as a remaining condition, i.e., determines that the current acceleration of the vehicle is lower than the first preset acceleration reference value as0, and determines the current driving state as sudden braking of an abrupt deceleration state. Although the preset reference value is set as a range of the first preset acceleration reference value as0 and the second preset acceleration reference value as1, in some cases, various configurations can be made according to a design specification, such as subdividing the determination step by setting a separate preset reference value for determining the sudden braking.

The current driving state of the vehicle is determined according to a result of the determination made at the acceleration driving state determination step described above, and it includes the driving sound output execution step (steps S475, S476, S477 and S478) of outputting a driving sound according to the determined and set vehicle driving state. The driving sound output execution step (steps S475, S476, S477 and S478) includes a light acceleration driving sound generation step (S475), a rapid acceleration driving sound generation step (S476), a sudden brake driving sound generation step (S477) and a driving sound execution step (S478), and if it is determined at the step S473 that the current driving state of the vehicle is a light acceleration state, the control unit 400 generates a driving sound through the sound source generation unit 600 using a sound source corresponding to the light acceleration driving sound from the sound source storage unit 500. In the same manner, if it is determined at the step S474 that the current driving state of the vehicle is a rapid acceleration state or a sudden brake state, the control unit 400 generates a driving sound through the sound source generation unit 600 using a sound source corresponding to the rapid acceleration driving sound or the sudden brake driving sound from the sound source storage unit 500 (steps S476 and S477).

Then, the control unit 400 outputs a driving sound corresponding to each state by executing an external or internal output through the sound source amplification unit 700 and the sound output unit 800 using the sound source regenerated at the steps of S475, S476 and S477 (S478).

As described above, the driving sound output step (S47) of the present invention configures the steps of determining an actual current driving state of the vehicle and generating, amplifying and outputting a sound source precisely corresponding to the driving state using various sound sources.

In addition, a driving sound or the like output in an embodiment of the present invention can be generated by combining and mixing various sound sources together with change of pitch. That is, the sound source playback unit 600 of the environmentally-friendly vehicle sound generator apparatus of the present invention includes the sound source mixing unit 610, and since the sound source mixing unit 610 generates a driving sound close to a real engine sound of a vehicle which drives in various real environments by regenerating a new sound source generated by combining various sound sources stored in the sound source storage unit 500, the possibility of generating a safety accident of a driver or a pedestrian can be remarkably lowered by minimizing a sense of difference from a real vehicle engine sound.

The sound source playback unit 600 may take a method of simultaneously mixing and outputting a plurality of sound sources or take a method of sequentially outputting sound sources respectively corresponding to each driving sound according to a driving state, e.g., a driving speed.

When a plurality of sound sources is simultaneously mixed and output, for example, a sound source B1, which is a low frequency sound source unrelated to change of speed corresponding to a sound of a low frequency range of 100 Hz to 300 Hz which is a basic major frequency domain of a real internal combustion engine, is output as a basic sound source without change of pitch or volume, and, in addition to this, a sound source provided with a frequency component gently increasing to be higher than an initially generated frequency domain according to the change of speed are mixed and output in a method of increasing the sound pressure as the vehicle speed increases, and thus in the case of an actually output sound, since the frequency and sound pressure are gently increased, a driver or a pedestrian may audibly recognize that a vehicle is driving at a gently increasing speed through the output sound.

On the other hand, the continuation confirmation step (S56) of the present invention is executed after an engine start sound or a driving sound of the vehicle is output, and whether or not to output a corresponding operating sound can be determined or controlled through confirmation of the current state. That is, the continuation confirmation step (S56) is executed after the driving sound operating step (S45), in which the control unit 400 determines an operation state of the vehicle after calculating the vehicle driving speed and updating the engine state sensing signal of the vehicle state sensing unit 100, and the sound output unit 800 determines and executes whether or not to continue output of an operating sound such as an engine start sound or a driving sound. The continuation confirmation step (S56) includes a high speed stop confirmation step (S57) and an output state confirmation step (S58). The high speed stop confirmation step (S57) confirms the current operation state of the vehicle by updating the vehicle driving speed signal and the engine state sensing signal of the vehicle state sensing unit 100, i.e., an engine start signal for determining whether or not the engine start is continued, and determines and executes whether or not to stop the driving sound by determining whether or not the vehicle drives at a high speed. That is, if it is determined at the high speed stop confirmation step (S57) that the vehicle is in a driving state and a driving sound is output, it is determined that a virtual driving sound is not needed when the vehicle enters the high speed driving state, and output of the virtual driving sound is stopped. The high speed stop confirmation step (S57) includes a high speed driving determination step (S48) and a driving sound stopping step (S49) and may further include a light acceleration driving state determination step (S50) in some cases. That is, the control unit 400 determines whether or not the current vehicle speed exceeds the preset speed Vs by confirming or updating the current vehicle speed and comparing the current vehicle speed with the preset speed Vs. If it is determined at the step S48 that the current vehicle speed exceeds the preset speed Vs, the control unit 400 determines that the vehicle currently enters the high speed driving state and output of the driving sound is not needed and executes the driving sound stopping step (S49) of excluding output of the driving sound. Although such a preset speed Vs may have a value the same as described above, if noise of the road surface according to driving of the vehicle exceeds the engine sound of the vehicle, it can be adjusted diversely according to the design specification. The vehicle speed is continuously updated by executing the light acceleration driving state determination step (S50) after the driving sound stopping step (S49), and then it is confirmed whether or not the vehicle speed arrives at a domain less than the preset speed Vs. If the vehicle speed arrives at a corresponding domain, it is determined that output of the driving sound is needed, and the control flow proceeds to the driving sound output step (S47) to output a driving sound when the vehicle speed enters again the corresponding speed domain.

Contrarily, if it is determined at the light acceleration driving state determination step (S50) that the current vehicle speed does not enter the domain less than the preset speed Vs, the control unit 400 determines that the vehicle maintains the high speed driving state and output of the driving sound is not needed and repeats the light acceleration driving state determination step (S50) by switching the control flow before or after the step S49.

Meanwhile, the environmentally-friendly vehicle sound generator apparatus and a control method thereof takes a structure of preventing generation of a feeling of displeasure caused by repetitive operation of discontinuing and continuing output of a sound due to frequent change of speed in executing a fade-out function when the driving sound stopping step (S49) is executed. That is, the vehicle state sensing unit may sense the vehicle speed through an engine RPM and a signal of shift gears or through a signal of a vehicle speed sensor arranged on a wheel of the vehicle, and if it is determined according to a vehicle speed signal of the vehicle state sensing unit that the vehicle speed reaches a preset speed range, the control unit 400 of the present invention fades out the output of the sound output unit 800 at a preset ratio of the vehicle speed to a time elapsed after the vehicle speed reaches the preset speed range.

Figure 7:
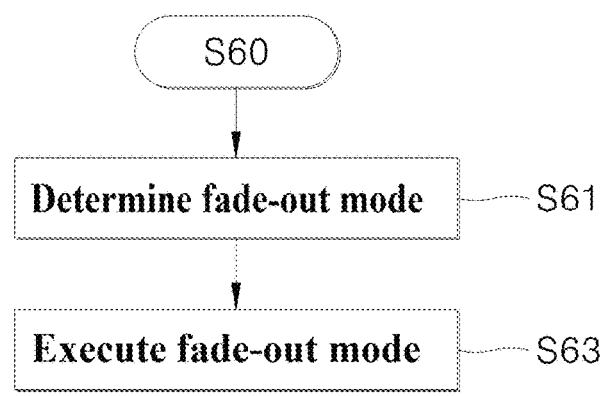
Figure 8:
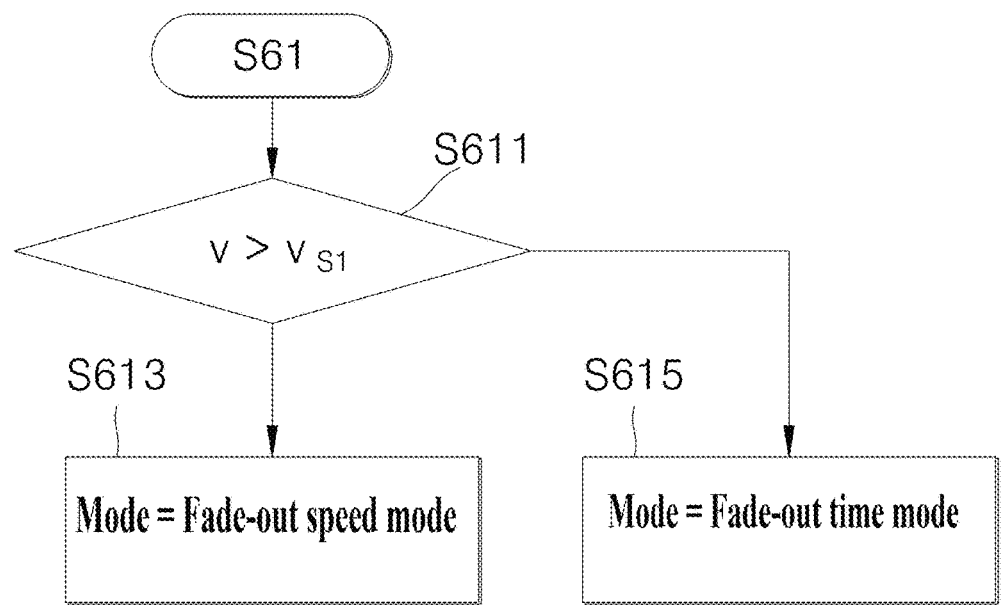
Figure 9:
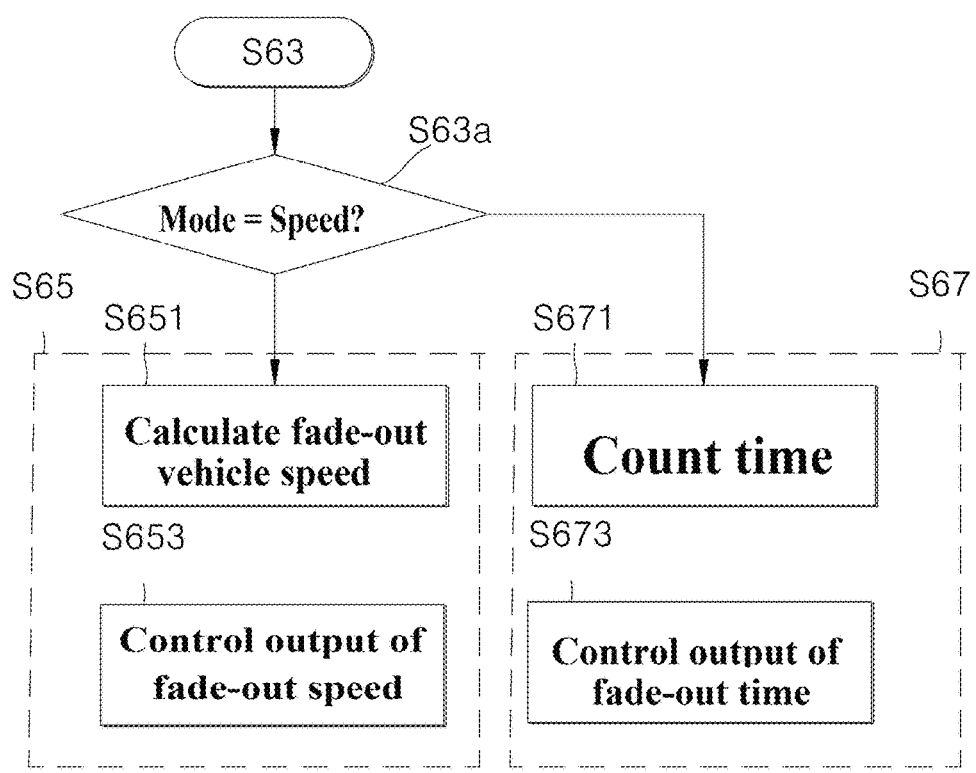

That is, the operating sound execution step (S40) of the present invention includes a fade-out step (S60), and the fade-out step (S60, see FIGS. 7 to 9) may be executed after the driving sound stopping step (S49) is executed. If it is determined according to the vehicle speed signal of the vehicle state sensing unit that the vehicle speed reaches the preset speed range, the fade-out step (S60) fades out the output of the sound output unit at a preset ratio of the vehicle speed to a time elapsed after the vehicle speed reaches the preset speed range.

The fade-out step (S60) includes a fade-out mode determination step (S61) and a fade-out mode execution step (S63), and the vehicle speed is compared with a preset fade-out mode determination speed at the fade-out mode determination step (S61), and the fade-out mode determined at the fade-out mode determination step (S61) is executed at the fade-out mode execution step (S63).

The fade-out mode execution step (S63) includes a fade-out speed mode (S65) and a fade-out time mode (S67). If it is determined at the fade-out speed mode (S65) that the vehicle speed is lower than the preset fade-out mode determination speed, the control unit 400 reduces output of the sound output unit at a preset fade-out speed ratio according to the vehicle speed.

The fade-out speed mode (S65) includes a fade-out vehicle speed calculation step (S651) and a fade-out speed output control step (S653). A fade-out vehicle speed is updated and calculated at the fade-out vehicle speed calculation step (S651) by averaging the vehicle speed input during a preset holding time, and the output output of the sound output unit is reduced at the fade-out speed output control step (S653) at a preset fade-out speed ratio according to the fade-out vehicle speed.

On the other hand, in the fade-out time mode (S67), if the vehicle speed is higher than the preset fade-out mode determination speed, the control unit 400 reduces the output output of the sound output unit at a preset fade-out time ratio according to a time elapsed after the vehicle speed enters a range higher than a preset speed.

The fade-out time mode (S67) includes a time counting step (S671) and a fade-out time output control step (S673). At the time counting step (S671), the control unit 400 confirms a time elapsed after the vehicle speed enters a range higher than a preset speed, and at the fade-out time output control step (S673), the control unit 400 reduces the output of the sound output unit at the preset fade-out time ratio according to the elapsed time.

Figure 10:
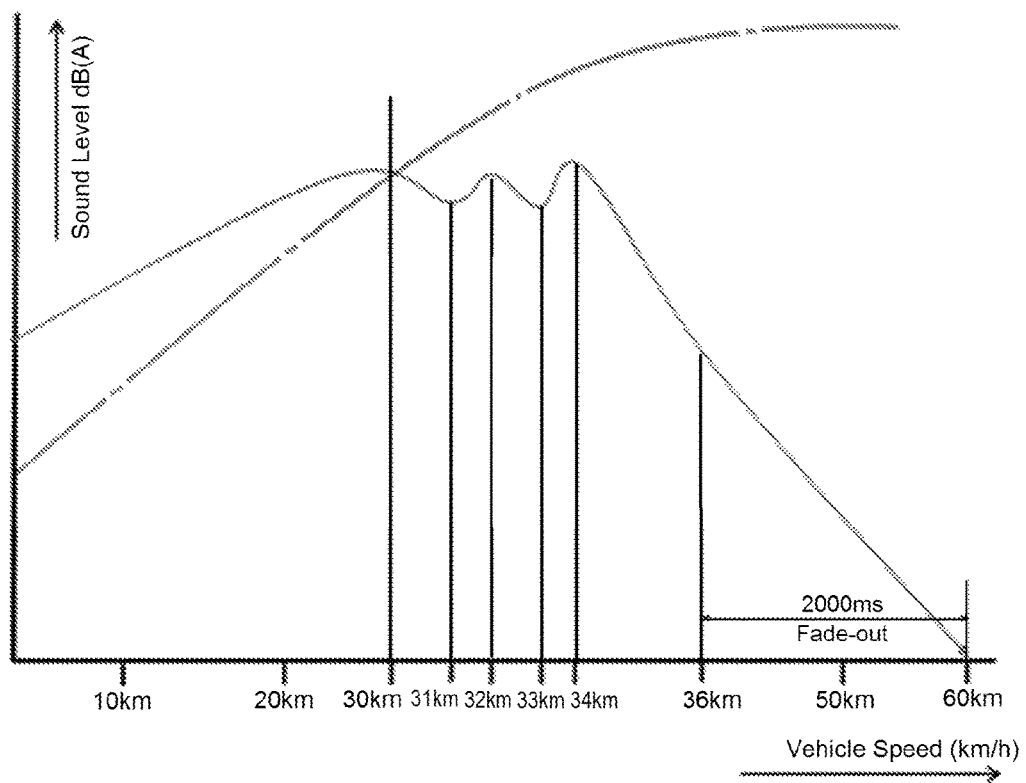
FIGS. 10 to 12 are diagrams illustrating operation states and procedures of a fade-out function of an environmentally-friendly vehicle sound generator apparatus according to an embodiment of the present invention.
Figure 12:
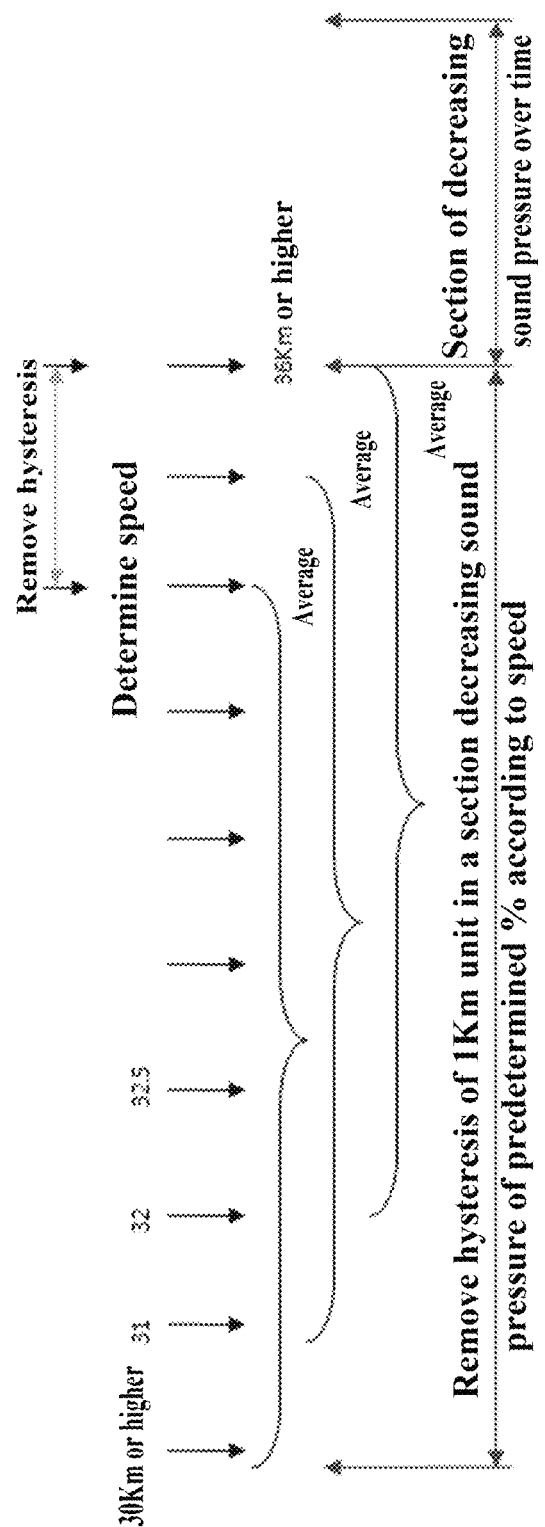

FIGS. 10 and 12 are views showing a sound diagram of a vehicle speed with respect to a sound output level and diagrams illustrating operation states, as a result of executing an environmentally-friendly vehicle sound generator apparatus and a control method thereof according to an embodiment of the present invention.

Figure 11:
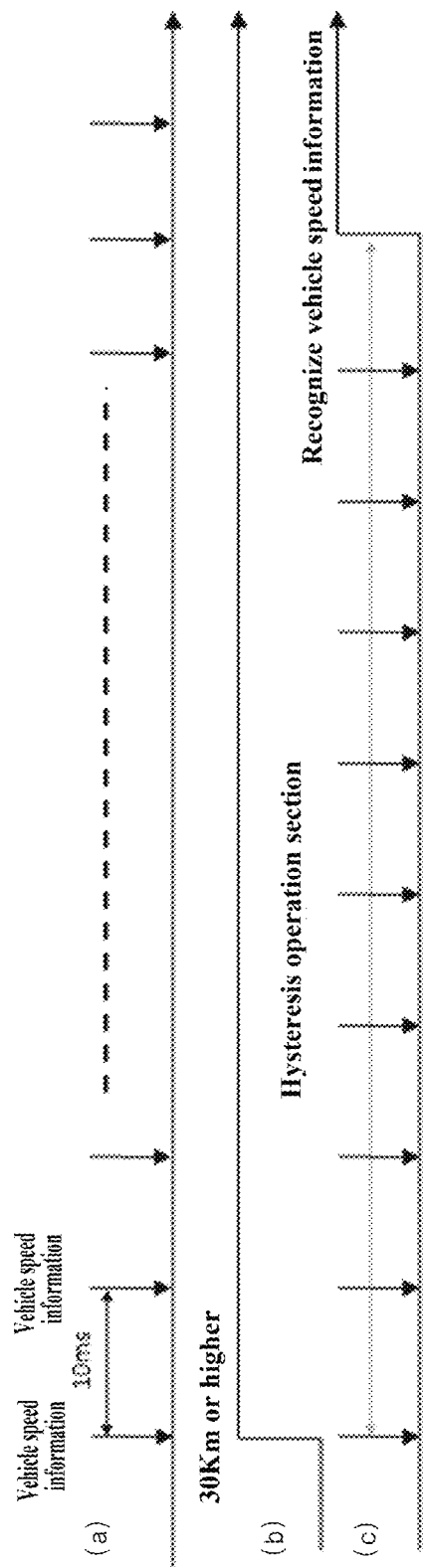

If it is assumed that the speed exceeds, for example, 30 km/h (FIG. 11(b) after passing through, for example, the driving sound stopping step as shown in FIG. 11(a) and information on the vehicle speed is input every 10 ms, in the present invention, the fade-out vehicle speed is updated and calculated by setting a regular time interval, i.e., a preset holding time, and averaging the vehicle speed input during the preset holding time (S651, see FIG. 11(c)), and output of the sound output unit is reduced at a preset fade-out speed ratio using a corresponding fade-out vehicle speed (S653).

That is, as shown in FIG. 12, although change of speed occurs frequently during the preset holding time intervals, since a value calculated by averaging the vehicle speed input during the preset holding time intervals is set as a fade-out vehicle speed, robustness can be secured by preventing generation of a hysteresis section caused by frequent change of actual vehicle speed.

In addition, if the vehicle speed is higher than the fade-out mode determination speed vs2, since the fade-out function is affected only when the speed of the vehicle itself is changed as much as 20% or more although the speed is frequently changed in a corresponding section, the corresponding section may be regarded as a speed range in which frequent on/off of the fade-out function can be prevented in a start speed section where a range of change with respect to the speed of vehicle itself is small, and thus if the vehicle speed is higher than the fade-out mode determination speed vs2, the control unit 400 executes the fade-out time mode which reduces the output of the sound output unit, i.e., the sound pressure, over time. That is, it is possible to take a structure of reducing the sound pressure, i.e., output of the sound output unit, at a preset fade-out time ratio with respect to an elapsed time by counting the elapsed time (S671) if the vehicle speed is higher than the fade-out mode determination speed. Although the elapsed time is set to 2,000 ms in this embodiment, this is merely an example of the present invention, and the size of the elapsed time can be changed diversely according to a vehicle type or an environment.

As described above, generation of a feeling of uneasiness or displeasure of a passenger, such as a pedestrian or a driver, due to occurrence of a repetitive fade-out phenomenon caused by frequent change of vehicle speed can be prevented by simultaneously considering a vehicle speed and a preset speed, i.e., a time elapsed after a fade-out mode determination speed is finished.

Meanwhile, the continuation confirmation step (S56) includes the output state confirmation step (S58) in addition to the high speed stop confirmation step (S57), and the output state confirmation step (S58) confirms the current operation state of the vehicle by updating the vehicle driving speed signal and the engine state sensing signal of the vehicle state sensing unit 100 and confirms, determines and executes whether or not to continue the engine start sound or the driving sound by determining whether or not the vehicle engine is turned off. The output state confirmation step (S58) includes a vehicle stop confirmation step (S51) and a vehicle start confirmation step (S53), and the control unit 400 confirms at the vehicle stop confirmation step (S51) whether or not the vehicle drives or stops currently by confirming the speed of the vehicle. That is, if it is determined at the high speed driving determination step (S48) of the high speed stop confirmation step (S57) that the driving speed of the vehicle is not in a high speed driving state, the control unit 400 executes the vehicle stop confirmation step (S51), and if it is not determined at the vehicle stop confirmation step (S51) that the vehicle is stopped, the control unit 400 switches the control flow to steps S48 to continue the driving sound and repeat the high speed driving determination step. Contrarily, if it is determined that the vehicle is stopped, the control unit 400 confirms whether or not a stop signal is generated by the stop of the engine or the start button of the vehicle by executing the vehicle start confirmation step (S53), and if it is determined that start of the engine of the vehicle is continued, the control unit 400 proceeds the flow control to step S44 to continue output of the engine start sound and confirm whether or not to switch to a driving state of the vehicle.

Contrarily, if it is determined at the step S53 that the vehicle stops or the engine is turned off through the start button of the vehicle, the overall control of the environmentally-friendly vehicle operating sound apparatus can be terminated, or, in some cases, if a vehicle key withdrawal confirmation step (S55) is further provided, there may be further provided a process of confirming whether or not the environmentally-friendly vehicle operating sound apparatus stops when a vehicle key withdrawal signal is generated, i.e., a conventional vehicle key is separated from the keyhole, or, in the case of a smart key, a driver possessing the smart key moves away from the vehicle more than a predetermined distance, and thus the overall state of the vehicle is switched to a stopped state or a surveillance mode for preventing theft of the vehicle.

While the present invention has been described in connection with the exemplary embodiments illustrated in the drawings, they are merely illustrative and the invention is not limited to these embodiments. It will be appreciated by a person having an ordinary skill in the art that various equivalent modifications and variations of the embodiments can be made without departing from the spirit and scope of the present invention. Therefore, the true technical scope of the present invention should be defined by the technical spirit of the appended claims.

What is claimed is:

1. A control method of an environmentally-friendly vehicle sound generator apparatus, the method comprising:

a providing step of providing an environmentally-friendly vehicle sound generator apparatus including: a vehicle state sensing unit for sensing an operation state of a vehicle; a sound source storage unit for storing a plurality of operating sounds that can be output according to the operation state of the vehicle in the form of a sound source data; a sound source playback unit for selecting at least one of the operating sounds stored in the sound source storage unit, and playing back the selected sound source output from the sound source storage unit; a sound source amplification unit for amplifying the operating sound played back by the sound source playback unit; a sound output unit for outputting the operating sound amplified by the sound source amplification unit; and a control unit for receiving a sensing signal from the vehicle state sensing unit and controlling the operation of the sound source playback unit so as to play back the operating sound in different playback methods in such a manner as to control and change the operating sound according to the received sensing signal, wherein the vehicle state sensing unit senses a vehicle speed, and wherein if it is determined according to a vehicle speed signal of the vehicle state sensing unit that the vehicle speed reaches a preset speed range, the control executes a fade-out function in consideration of a vehicle speed and a time after the vehicle speed enters a speed over the preset speed range; and an operating sound execution step of allowing the control unit to determine whether or not to generate an operating sound of the environmentally-friendly vehicle according to the vehicle operation state sensed by the vehicle state sensing unit, and outputting one or more sound sources, selected among the sound sources stored in the sound source storage unit, as the operating sounds through the sound output unit, wherein the operating sound execution step comprises a fade-out step (S60) of fading out the output of the sound output unit, if the vehicle speed reaches the preset speed range, with at least one of a preset ratio corresponding to the vehicle speed and a preset ratio corresponding to an elapsed time after the vehicle speed enters a speed over the preset speed range, wherein the fade-out step (S60) comprises:

a fade-out mode determination step (S61) of comparing the vehicle speed with a preset fade-out mode determination speed; and a fade-out mode execution step (S63) of executing the fade-out mode determined at the fade-out mode determination step (S61).

2. The control method according to claim 1, wherein the fade-out mode execution step (S63) comprises a fade-out speed mode (S65) of reducing, if the vehicle speed is lower than the preset fade-out mode determination speed, the output of the sound output unit at a preset fade-out speed ratio according to the vehicle speed.

3. The control method according to claim 2, wherein the fade-out speed mode (S65) comprises:
- a fade-out vehicle speed calculation step (S651) of updating and calculating a fade-out vehicle speed by averaging the vehicle speed input during a preset holding time; and
- a fade-out speed output control step (S653) of reducing the output of the sound output unit at the preset fade-out speed ratio according to the fade-out vehicle speed.

4. The control method according to claim 1, wherein the fade-out mode execution step (S63) comprises a fade-out time mode (S67) of reducing, if the vehicle speed is higher than the preset fade-out mode determination speed, the output of the sound output unit at a preset fade-out time ratio according to a time elapsed after the vehicle speed enters a range higher than a preset speed.

5. The control method according to claim 4, wherein the fade-out time mode (S67) comprises:
- a time counting step (S671) of confirming a time elapsed after the vehicle speed enters a range higher than the preset speed; and
- a fade-out time output control step (S673) of reducing the output of the sound output unit at the preset fade-out time ratio according to the elapsed time.

\* \* \* \* \*